United States Patent
Lagos et al.

(10) Patent No.: US 10,339,122 B2
(45) Date of Patent: Jul. 2, 2019

(54) ENRICHING HOW-TO GUIDES BY LINKING ACTIONABLE PHRASES

(71) Applicant: Conduent Business Services, LLC, Dallas, TX (US)

(72) Inventors: Nikolaos Lagos, Grenoble (FR); Matthias Gallé, Saint Martin d'Hères (FR); Alexandr Chernov, Tübingen (DE)

(73) Assignee: Conduent Business Services, LLC, Florham Park, NJ (US)

( * ) Notice: Subject to any disclaimer, the term of this patent is extended or adjusted under 35 U.S.C. 154(b) by 305 days.

(21) Appl. No.: 14/850,060

(22) Filed: Sep. 10, 2015

(65) Prior Publication Data

US 2017/0075935 A1  Mar. 16, 2017

(51) Int. Cl.
| | |
|---|---|
| *G06N 5/02* | (2006.01) |
| *G06F 16/22* | (2019.01) |
| *G06F 16/31* | (2019.01) |
| *G06F 16/93* | (2019.01) |
| *G06F 17/22* | (2006.01) |
| *G06F 17/27* | (2006.01) |
| *G06N 20/00* | (2019.01) |
| *G06F 16/2457* | (2019.01) |

(52) U.S. Cl.
CPC .... *G06F 16/2228* (2019.01); *G06F 16/24578* (2019.01); *G06F 16/313* (2019.01); *G06F 16/93* (2019.01); *G06F 17/2235* (2013.01); *G06F 17/2775* (2013.01); *G06N 5/022* (2013.01); *G06N 20/00* (2019.01)

(58) Field of Classification Search
CPC .................................................. G06F 17/30321
See application file for complete search history.

(56) References Cited

U.S. PATENT DOCUMENTS

| | | | |
|---|---|---|---|
| 7,058,567 B2 | 6/2006 | Aït-Mokhtar et al. | |
| 7,398,196 B1* | 7/2008 | Liu | G06F 17/2745 704/1 |
| 8,046,372 B1* | 10/2011 | Thirumalai | G06F 17/30616 707/749 |
| 2001/0014852 A1* | 8/2001 | Tsourikov | G06F 17/272 704/9 |

(Continued)

OTHER PUBLICATIONS

Natural Language Toolkit, pp. 1-2, downloaded at http://www.nltk.org on Aug. 5, 2015.

(Continued)

*Primary Examiner* — Jeff A Burke
*Assistant Examiner* — Dawaune A Conyers
(74) *Attorney, Agent, or Firm* — Fay Sharpe LLP

(57) ABSTRACT

A computer-implemented linking system and method provide for linking actionable phrases in a first document to other documents in a document corpus. The method includes identifying at least one actionable phrase in a first document. The actionable phrase may include an action, its direct object, and any modifier of the direct object. For each identified action phrase the document corpus is searched to identify other documents, which are scored using a scoring function which takes into account occurrences of words of the actionable phrase in each identified document. The actionable phrase is linked to at least a part of one of the most highly ranked documents in the set of documents.

21 Claims, 7 Drawing Sheets

(56) References Cited

U.S. PATENT DOCUMENTS

| | | | |
|---|---|---|---|
| 2006/0197973 A1 | 9/2006 | Castellani | |
| 2007/0022073 A1* | 1/2007 | Gupta | G06N 5/022 |
| | | | 706/45 |
| 2008/0091408 A1* | 4/2008 | Roulland | G06F 17/271 |
| | | | 704/9 |
| 2010/0229080 A1 | 9/2010 | Roulland et al. | |
| 2012/0150920 A1 | 6/2012 | Roulland et al. | |
| 2014/0304579 A1* | 10/2014 | Foster | G06F 17/2235 |
| | | | 715/205 |
| 2016/0253294 A1* | 9/2016 | Allen | G06F 17/2235 |
| | | | 715/206 |

OTHER PUBLICATIONS

Whoosh 2.7.0: Python Package Index, pp. 1-2 downloaded at https://pypi.python.org/pypi/Whoosh, on Aug. 5, 2015.

Aït-Mokhtar, et al., "Robustness beyond shallowness: Incremental deep parsing," Nat. Lang. Eng., vol. 8(3), pp. 121-144 (2002).

Aït-Mokhtar, et al., "Incremental Finite-State Parsing," Proc. Applied Natural Language Processing, pp. 72-79, 1997.

Aït-Mokhtar, et al., "Subject and Object Dependency Extraction Using Finite-State Transducers," Proc. ACL '97 Workshop on Information Extraction and the Building of Lexical Semantic Resources for NLP Applications, pp. 71-77, 1997.

Pareti, et al., "Integrating know-how into the linked data cloud," Knowledge Engineering and Knowledge Management, pp. 385-396 (2014).

Paris, et al., "Automated knowledge acquisition for instructional text generation," Proc. 20th Annual Int'l Conf. on Computer Documentation, SIGDOC '02, pp. 142-151, (2002).

U.S. Appl. No. 14/702,850, filed May 4, 2015, Dymetman, et al.

Robertson, et al., "The Probabilistic Relevance Framework: BM25 and Beyond," Foundations and Trends in Information Retrieval, 3(4) pp. 333-389 (2009).

Zhang, et al., "Automatically extracting procedural knowledge from instructional texts using natural language processing," Proc. $8^{th}$ Int'l Conf. on Language Resources and Evaluation (LREC'12), pp. 520-527 (2012).

* cited by examiner

ENRICHING HOW-TO GUIDES BY LINKING ACTIONABLE PHRASES

BACKGROUND

The exemplary embodiment relates to the linguistic processing arts and finds particular application in connection with a system and a method for enriching documents, such as how-to guides, with links from actionable phrases to relevant information elsewhere in a document corpus.

How-to guides are widely used for providing instructions on how to accomplish a specific task, e.g., how to choose a PC, how to install an application on a smartphone, or how to cook spaghetti. There are numerous websites which allow users to post how-to guides so that others can search them. Most of the guides are written by enthusiastic, not-paid contributors, who do not generally consider that there may be relationships between the newly-created content and previously-created guides. Knowledge bases (KBs) that contain such content are valuable through the sum of their single entries, but because each entry is created largely independently, users (software, agents, and managers) cannot take advantage of the accumulated knowledge that could be developed by the aggregation of related entries.

This is also the case for many commercial settings. Customer care departments managing KBs containing how-to guides for troubleshooting and implementation do not always follow rigorous processes for their creation. Business pressure and short iteration time frames do not allow time to re-organize and optimize the KBs regularly. In addition to making customer care sessions longer, this can cause problems where troubleshooting sessions are handled by software (e.g., a virtual agent) with little or no human supervision. For example, the virtual agent may be designed to provide a user with a pointer to a single entry in the KB, which may contain one or more instructions. If the user has a problem with one of the provided instructions, the only way of solving this is may be to start another interaction/session.

It would be desirable therefore, to be able to inter-link KB entries, allowing relevant information to be acquired from other parts of the KB.

While there have been studies on organization of web forums, how-to knowledge, sometimes referred to as procedural knowledge, is often still poorly organized. See, e.g., Zhang, et al., "Automatically extracting procedural knowledge from instructional texts using natural language processing," LREC'12, 2012, hereinafter, "Zhang 2012." Methods have been proposed for linking part of one document to other document(s). The objective is to link a step, such as "Install an operating system" to its sub-steps, e.g., "format a disc," "create disc partitions," "install drivers for a video card," and so forth. See, Pareti, et al., "Integrating know-how into the linked data cloud, Knowledge Engineering and Knowledge Management, pp. 385-396, 2014 (hereinafter, "Pareti 2014"). In that approach, the text is first segmented into steps and then a text search engine is used to find a set of candidate links for each step. A trained classifier is used to filter out irrelevant results. However, the results can still be quite noisy.

Others have developed methods for extraction of text spans. See, Zhang 2012, and Cécile Paris, et al., "Automated knowledge acquisition for instructional text generation," Proc. 20th Annual Int'l Conf. on Computer Documentation, SIGDOC '02, pp. 142-151, 2002, hereinafter, Paris 2002.

U.S. Pub. No. 20120150920 describes a method for linking parts of a physical device shown in a graphical interface to corresponding noun phrases in a knowledge base that refer to the parts of the device. Verbs linked to the noun phrases are also identified using a lexicon of verbs that refer to physical actions on a device. However, the problem of linking extracted spans of text to other documents has not been addressed.

INCORPORATION BY REFERENCE

The following references, the disclosures of which are incorporated herein by reference in their entireties, are mentioned:

U.S. Pub. No. 20120150920, published Jun. 14, 2012, entitled METHOD AND SYSTEM FOR LINKING TEXTUAL CONCEPTS AND PHYSICAL CONCEPTS, by Roulland, et al.

U.S. Pat. No. 7,058,567, issued Jun. 6, 2006, entitled NATURAL LANGUAGE PARSER, by Aït-Mokhtar, et al.

BRIEF DESCRIPTION

In accordance with one aspect of the exemplary embodiment, a linking method includes identifying at least one actionable phrase in a first document. For each of the at least one identified action phrase, the method includes identifying a set of documents in a document corpus using a scoring function which takes into account occurrences of words of the actionable phrase in each identified document, and linking the actionable phrase to at least a part of one of the documents in the set of documents or to information extracted therefrom.

At least one of the: identifying of the at least one actionable phrase, identifying of the set of documents in the document corpus, and linking the actionable phrase to at least one of the documents may be performed with a processor.

In accordance with another aspect of the exemplary embodiment, a linking system includes memory which stores a collection of terms and an index for a document corpus. A syntactic analyzer processes documents in the document corpus to identify parts of speech of words in each document and dependencies between verbs and their direct objects. An actionable phrase identifier identifies actionable phrases in the documents, each actionable phrase including an action verb and an action object. The action object includes a direct object of the action verb, and, where identified, a modifier of the direct object. The direct object is found in the collection of terms. A search component queries the index with words of an identified actionable phrase of a first of the documents and uses a scoring function to identify, where present, at least one other document in the document corpus that at least meets a threshold score. A linking component links the identified actionable phrase to at least a part of the at least one other document or to information extracted from the at least a part of the at least one other document. A processor in communication with the memory implements the syntactic analyzer, actionable phrase identifier, search component, and linking component.

In accordance with another aspect of the exemplary embodiment, a linking method includes, for each of a plurality of documents in a document corpus, applying rules for identifying action verbs in at least a part of the document. For each of the identified action verbs, the method includes identifying a direct object of the action verb, and determining whether the direct object is found in a collection of terms. If the direct object is found in the collection of terms, an actionable phrase is generated. The action phrase includes the action verb, its direct object, and any identified modifiers of the direct object. The method further includes searching an index of the document corpus with words of the actionable phrase to identify other documents in the document corpus which meet at least a threshold score on a scoring function. Provision is made for generating a link to information from at least a part of one of the other documents that at least meets the threshold score from the actionable phrase.

One or more of the steps of the method may be performed with a processor.

DETAILED DESCRIPTION

Aspects of the exemplary embodiment relate to a system and method for linking actionable phrases of a first document to information outside the document, such as other documents in a document corpus, e.g., in a knowledge base (KB). Being able to inter-link KB entries (and get relevant information from other parts of the KB) has several uses. Examples include:

1. A human reader in a self-help environment (e.g., a person who will perform the task or a human agent assisting that person) is able to click on or hover over the link in a first KB document to access a linked KB document or to cause a short summary or relevant portion of the linked KB document to be displayed to allow the reader to find out more detail related to the actionable phrase.

2. An automated (virtual) agent could use the linked information to expand more if the human customer expresses doubts about how to perform a specific instruction.

Briefly, the exemplary system and method considers a corpus of documents in the form of how-to articles, also called "procedural knowledge." For any given article, the aim is to identify segments of text ("actionable phrases") that are further explained by another article from the corpus. The output of the method for each article, may be a set of text segments, each associated with at least one link to another article. Rules are used to identify a relevant verbal part and a corresponding action object part, after a part-of-speech (POS) analysis. The longest segments discovered by these rules are retained as actionable phrases. For the link discovery, an information retrieval approach is used on the indexed corpus. A link is created toward the most relevant articles, when searching for the "actionable phrase"

Figure 1:
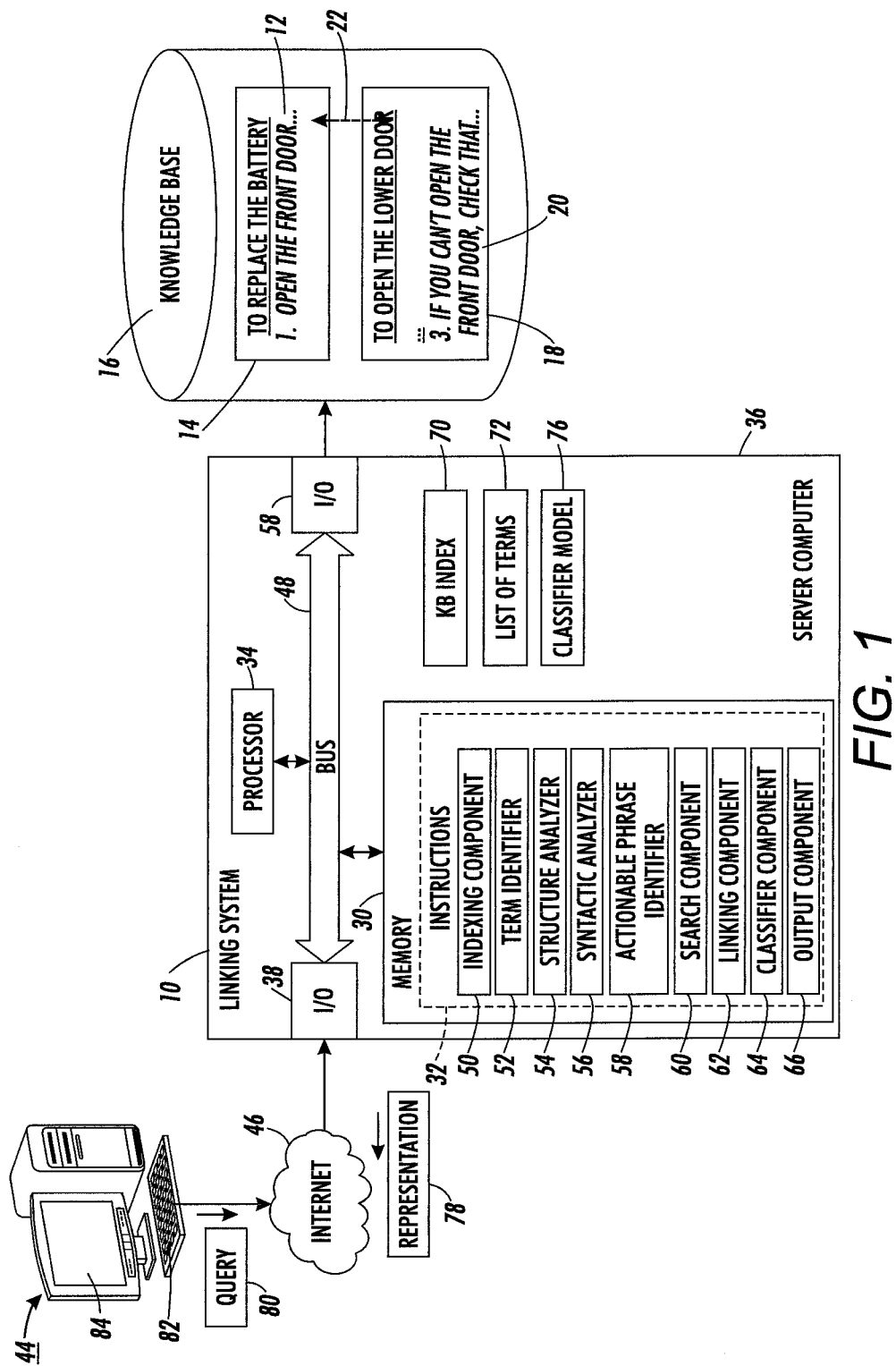
FIG. 1 is a functional block diagram of a system for linking actionable phrases in accordance with one aspect of the exemplary embodiment.

FIG. 1 illustrates a computer-implemented linking system 10. The linking system 10 identifies the semantic elements that compose actionable information as well as their inter-relations. In particular, the linking system provides for identifying an actionable phase 12 of one document 14 (referred to as a review document) in a document corpus, such as the illustrated knowledge base 16. The actionable phrase 12 is then linked to another document 18 (referred to as a reference document) in the knowledge base 16, or to information extracted therefrom, such as a document summary. The linked reference document 18 includes a set of one or more words 20 which match one or more of the words of the actionable phase 12. Each document 14, 18 can be an entire how-to article or a part thereof.

As used herein, an actionable phrase is a text fragment that describes how to perform a certain action. An actionable phrase includes an action and what the action is performed on, referred to herein as an action object. The action is or includes an action verb, e.g., click, type, open, which is to be performed. The action object includes the main (direct) object (an entity such as a noun or noun phrase) on which the action is performed, optionally any modifiers of the main object which serve as distinguishing characteristics, for example, modify the direct object with spatial and/or temporal information, and optionally related words up to the next action verb. Example actionable phases could include the following phrases in italics:

Open the cover, where open is the action and the cover is the action object (direct object of open)

Turn the upper handles, where turn is the action and the upper handles is the action object, with upper being the modifier and handles being the direct object of turn.

If you can turn the upper handle, where turn is the action and the upper handle is the action object, with upper being the modifier and handle being the direct object of turn.

Take the cover off, where take is the action and the cover is the action object (off is also included as it precedes the next actionable phrase and is related to take in a syntactic dependency).

A document 14 may include several actionable phrases. A single sentence may also have more than one actionable phrase, in which case, each actionable phrase may be treated separately.

In one embodiment, a link 22 is created between the actionable phrase 12 in the review document 14 and the reference document 18. The link can be in the form of a hyperlink, which a user can actuate, for example, by clicking on or hovering over the text. A hyperlink is broadly defined herein as any mechanism by which a pointing device applied to the actionable phase or text fragment thereof causes a transfer of the point of interest, cursor position, focus, or the like to the reference document or a text fragment thereof, such as a link in HTML or other markup language. Additionally or alternatively, information from the reference document 18 can be used to annotate or structure the review document.

In an exemplary embodiment, each document 14, 18 in the knowledge base 16 describes a problem/topic (which may be included in the title) and a solution to the problem, which may include a sequence of two or more steps to be performed, referred to as a procedure. See, for example, U.S. Pub. Nos. 20060197973, 20080091408, and 20100229080, incorporated herein by reference, for a description of such a knowledge base. One or more of the steps in a procedure may include two or more sub-steps. A problem may have more than one solution, in which case there may be more than one procedure in a given document. The knowledge base may be specific to a particular domain, e.g., a class of devices, such as computers, smartphones, printing devices, or household appliances, or to methods for performing types of tasks, such as performing electrical, plumbing or other household repairs, cooking, using online services, and the like. While the knowledge base 16 illustrated in FIG. 1 includes only two documents, it is to be appreciated that the knowledge base 16 may include a large number of documents, such as at least 50 or at least 100, or at least 1000 or more documents 14, 18. As will be appreciated documents in the knowledge base 16 can serve as review documents (only), reference documents (only), or as both review and reference documents.

Figure 2:
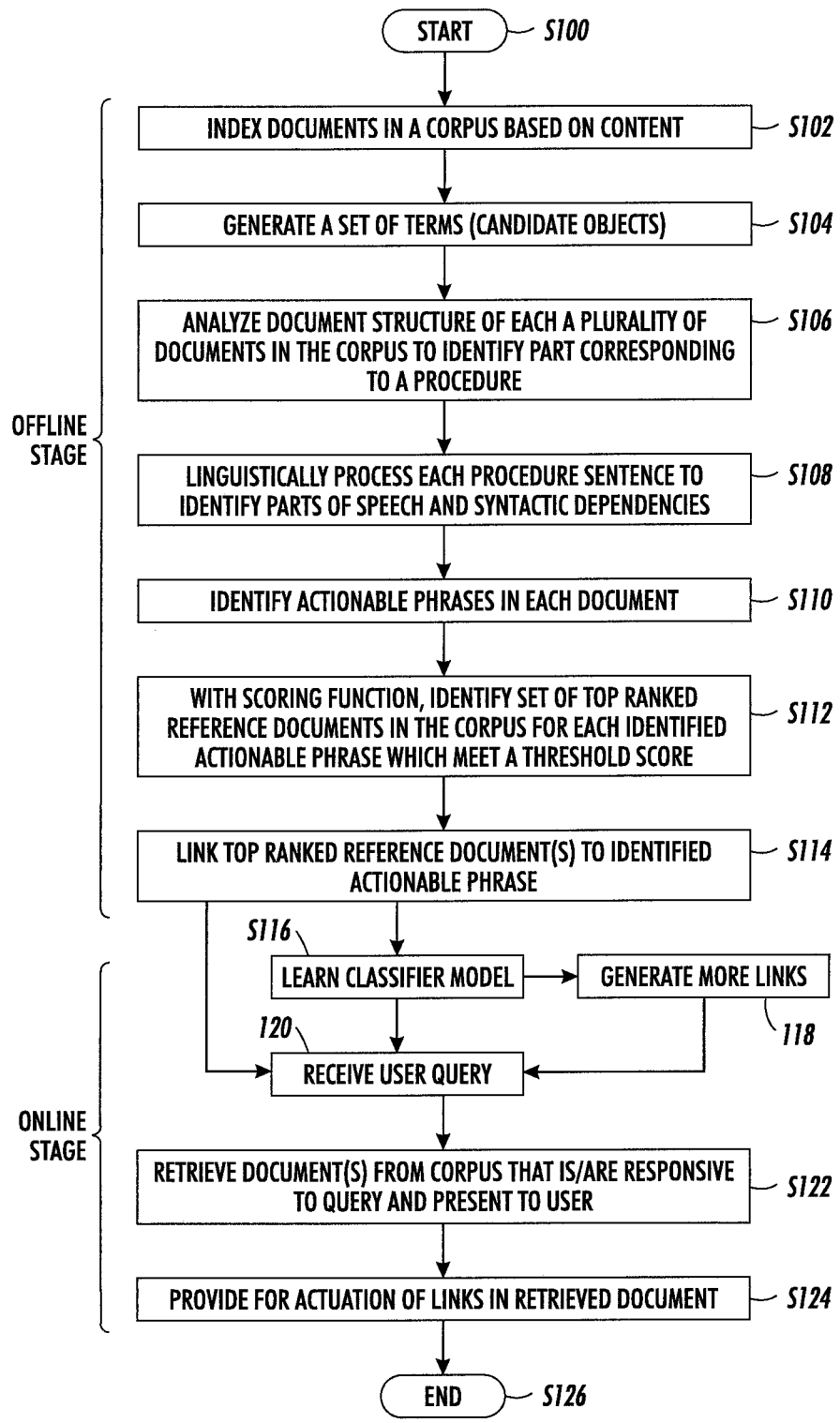
FIG. 2 is a flow chart illustrating a method for linking actionable phrases in accordance with one aspect of the exemplary embodiment.
Figure 3:
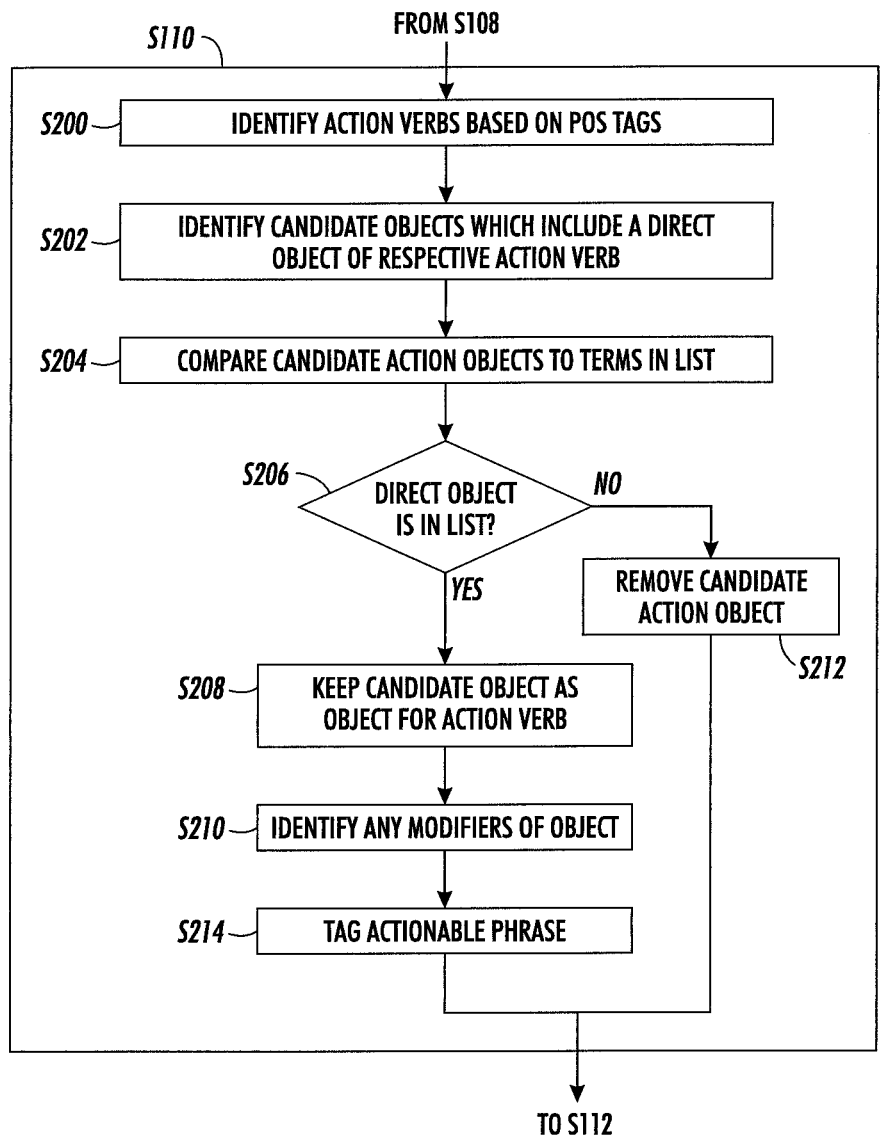
FIG. 3 illustrates an exemplary method for identifying actionable phrases in the method of FIG. 2.

The linking system 10 includes memory 30, which stores instructions 32 for performing the method illustrated in FIGS. 2 and 3 and a processor 34 in communication with the memory for executing the instructions. The system 10 may be hosted by one or more computer devices, such as the illustrated server computer 36. One or more input/output devices 38, 40 allow the system to communicate with external devices, such as remote memory which stores the knowledge base 16 and/or a client device 44, which may be communicatively linked to the server computer via wired or wireless connections 46, such as the Internet. Hardware components 30, 34, 38, 40 of the system may be communicatively linked by a data/control bus 48.

The illustrated instructions include a corpus indexing component 50, a term identifier 52, a structure analyzer 54, a syntactic analyzer 56, an actionable phase identifier 58, a search component 60, a linking component 62, a classifier component 64, and an output component 66, although fewer, more, or different components may be provided.

The indexing component 50 generates a document corpus (KB) index 70 from the documents in the knowledge base 16, if one has not been previously generated. Words found in the knowledge base 16 (optionally excluding stop words and/or other words which appear too frequently in the KB to be useful) are indexed according to the document 14, 18 in which they appear and optionally also according to whether they appear in the title or a subtitle or other part of the document which may be considered more relevant than others. The keywords in the index 70 may be associated with a score for each document in which they are found, which can be score based on the term frequency-inverse document frequency (tf-idf) for the word, and which may be weighted according to whether the word is found in a title of the document or only in the body text. The unit for indexing can be a document section rather than the whole document. Words may be indexed according to their surface form (how they appear in the document) and/or according to their root (lemma) form (e.g., the singular form may be used as the root form of a plural word, the infinitive form may be used as the root form of a verb, etc.). The KB index 70 may be stored in memory 30 or in remote memory accessible to the system 10.

The term identifier 52 generates a domain-specific terminology in the form of a collection of terms (entities) 72 with which candidate action objects can be matched, if this has not previously been generated. The collection 72 may be in the form of a list or other suitable data structure and may include a large number of terms such as at least 20, or at least 50, or at least 100, or at least 1000, or more terms. This list 72 may be generated from an enterprise/application-specific terminology, and/or external resources, such as Wikipedia or other online encyclopedia. The aim is to identify a list of terms which are relevant to the domain of the knowledge base and which an action verb could perform an act on. For example, if the knowledge base 16 relates to computing devices, the terms could be extracted from entries in Wikipedia or other online encyclopedia relating to computers and/or from a domain-specific terminology which describes or lists computer components. The list of terms 72 can be encoded as a Finite State Machine (FST) for ease of use. The terms in the list of terms are generally nouns or noun phrases, optionally with modifiers (e.g., keyboard, battery pack, lower handle, volume up key, iPhone 6). In some embodiments, a term in the collection 72 may include a set of synonyms which are considered equivalent, such as (Central Processing Unit, CPU). In other embodiments, the search component 60 may be equipped to retrieve similar/synonymous terms.

The structure analyzer 54 processes the KB documents 14, 18 to identify the part(s) of each document that have at least a threshold probability of being a procedure. How-to articles, in general, are well structured documents, with a title stating the main problem/topic that the document covers while actionable information is covered by the content of items represented as a numbered or bulleted list of instruction steps. In some cases, one bullet item or numbered step may have a number of sub-steps, which may each be considered as a separate step. The part(s) of the document containing a title and a sequence of steps are tagged as procedures. However, more advanced techniques could be used for identifying the part of the document corresponding to the procedure, such as geometric properties of the document, e.g., indents, capitalization, punctuation, or other features as described, for example, in U.S. Pub. No. 20120290288, published Nov. 15, 2012, entitled PARSING OF TEXT USING LINGUISTIC AND NON-LINGUISTIC LIST PROPERTIES, by Salah Aït-Mokhtar, the disclosure of which is incorporated herein by reference in its entirety.

In some cases, structural analysis may not be needed, for example, in the case of well-structured documents in a corporate knowledge base which are predominantly in the form of a procedure or procedures.

Once the procedures, i.e., parts of the documents including actionable information, have been identified, the syntactic analyzer 56 or a specific toolkit for identifying sentences, further segments each step within the numbered and/or bullet list into sentences. The syntactic analyzer 56 processes each sentence of the identified procedure to identify a sequence of tokens. It then performs morphological analysis to identify the most probable part of speech (POS) of each token in the sentence. The syntactic analyzer may then identify dependencies between tokens, particularly dependencies which identify a verb and its direct object in a sentence. The syntactic processing may be performed with a syntactic parser, such as a statistically-based or rule-based parser.

An exemplary general-purpose parser which may be used as the syntactic analyzer 56 processes the input text to identify tokens (words, numbers, and punctuation) and then associates the tokens with lexical information, such as noun, verb (and its form, such as infinitive, modal), preposition, adjective, adverb, etc. (POS), in the case of words, and punctuation type in the case of punctuation. From these basic labels, more complex information may be associated with the text, such as the identification of named entities, relations between entities and other parts of the text, and coreference resolution of pronouns (such as that "it" refers to a particular component). The linguistic processing produces syntactic relations such as subject (linking a subject of the sentence to its corresponding verb), direct object (linking a verb of the sentence to its corresponding object), modifier (linking a modifier of the sentence to its corresponding object), etc. These relations are optionally transformed into semantic relations depending on the semantic classes of the named entities (such as Person name, Organization name, Product name) or of the words that they link though dependencies.

An exemplary parser 56 of this type is a sequential/incremental parser, such as the Xerox Incremental Parser (XIP). For details of such a parser, see, for example, U.S. Pat. No. 7,058,567 to Aït-Mokhtar, et al.; Aït-Mokhtar, et al. "Robustness beyond shallowness: incremental deep parsing," in Natural Language Engineering, 8(3), Cambridge University Press, pp. 121-144 (2002); Aït-Mokhtar, et al., "Incremental Finite-State Parsing," Proc. Applied Natural Language Processing, 1997; and Aït-Mokhtar, et al., "Subject and Object Dependency Extraction Using Finite-State Transducers," Proc. ACL '97 Workshop on Information Extraction and the Building of Lexical Semantic Resources for NLP Applications, 1997. The syntactic analysis may include the construction of a set of syntactic relations (dependencies) from an input text by application of a set of parser rules. However, a dedicated parser may be constructed which uses fewer rules specific to the present application.

The actionable phrase identifier 58 searches for actionable phrases in the syntactically-processed procedures and labels them as actionable phrases, using the POS and dependency information generated by the syntactic analyzer 56. In one embodiment, the actionable phrase identifier 58 may be in the form of a set of rules built on top of the parser rules.

Figure 4:
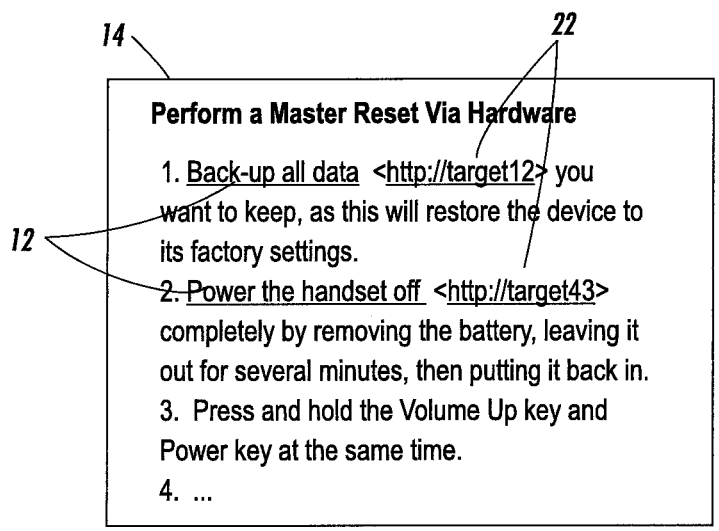
FIG. 4 is an example of a knowledge base entry and spans of text that link to other entries.

Documents 14, 18 in the knowledge base 16 may include other information in addition to a procedure, in which case the search for actionable phrases may be limited to the procedures, i.e., the parts of the document that describes the sequence of actions carried out to achieve a specific objective, as identified by the structure identifier. As an example, FIG. 4 illustrates an example review document 14 with actionable phases 12 identified (underlined, for ease of illustration only). For example, the phase "Power the handset off" is labeled as an actionable phrase, which may correspond to instructions which are further developed in other parts of the KB.

Each sentence in the review document 14 (or part(s) labeled as procedures) is analyzed to identify actionable phrases. The elements of an actionable phrase to be extracted are as follows.

Actions: Each action includes an action verb. The following set of rules are examples of rules which may be used to identify action verbs:

1. The verb starts a sentence.
2. The verb follows a modal verb. A modal verb is a type of auxiliary verb that is used to indicate modality—in particular, likelihood, ability, permission, or obligation. Examples in English include the verbs can/could, may/might, must, will/would, and shall/should.
3. The verb has the same form as the infinitive (e.g., turn, open, close, etc.

In one embodiment, the modality of the action verb itself may also or alternatively be considered. Verbs may have different modalities. There are at least the following types: obligation, request, suggestion, possibility, necessity, and explanation. Automatic detection of verb modalities could be used to identify verbs which oblige the user to do something.

One, two, three or more of (or all of) the action verb identifying rules, either alone or in combination, may be used to check for action verbs.

In the exemplary embodiment, the identified action verbs are not limited to any specific list of verbs, but may include all the verbs identified in the procedures that meet one or more of the specified rules for identifying actions.

Action Objects: Words following an action in a same sentence, but positioned before the next action verb, are candidates for representing the corresponding action object. In linguistic terms this includes the direct object of the action verb (as identified by the linguistic processor) and the longest linguistic expression in the same sentence whose global reference is that object (the candidate modifier). Each action object includes a direct object which is found in the collection of terms 72 (i.e., is an exact match with a term in the collection, or at least meet a threshold level of similarity with a term). Objects are generally tagged as nouns or noun phrases.

Action objects may be identified as follows:

(a) In a first stage, elements of the action object are selected based on their Part-of-Speech tag. The list of allowed POS tags may be a limited set of the POS tags used by the parser, e.g., includes: verbs, nouns, adjectives, adverbs, and pronouns. Determiners and prepositions may also be allowed since they will be filtered out in the linking stage and having a continuous span of text to display can help when showing those spans to human agents. In an exemplary embodiment, an action object cannot end with a preposition, determiner, or pronoun.

(b) At a second stage, the extracted objects in the candidate action object are compared against the list of terms 72 that represent domain-specific entities and therefore worth considering as candidates for linking. The fragment with the longest candidate (in number of tokens) matching a term is selected and treated as the entity to be used for linking.

In some embodiments, co-reference of pronouns to other words in the same document may be used to identify action objects. For example, given the step:

Shut down the remote computer, wait 2 minutes, then restart it, the parser can be used to identify that it refers to remote computer. The word it can then be tagged with remote computer, allowing restart it (restart the remote computer) to be extracted as an actionable phrase in addition to Shut down the remote computer.

The acceptable modifiers of the direct object (where present) can be limited to a specific class or classes of modifiers, such as spatial (upper, lower, local, remote, etc.), temporal (first, last, etc.), or include all classes of modifier. Modifiers may be limited to those tagged by the syntactic analyzer as adjectives and adjectival phrases. In one embodiment, the modifiers are premodifiers, i.e., precede the direct object in the text sequence. In another embodiment, they can be drawn from the entire portion of the sentence (other than the identified object) after the action verb and preceding the next action verb.

In some embodiments coordination may be used to identify two or more action verbs that relate to the same action object. For example, given the step:

Shut down and restart the remote computer using the switch on the front panel, then close the door.

the parser may be used to determine that computer is the direct object of the actions shut down and restart and that remote is a modifier of computer. Assuming that computer is in the list of terms 72, the information may be used to generate two action phrases:

Shut down the remote computer
Restart the remote computer

In one embodiment, the subsequent words: using the switch on the front panel may also be considered as part of the actionable phrase as they precede the next identified action verb (close) in the same sentence.

Each actionable phrase extracted thus includes a (single) action, i.e., a verb which is in at least one of the permitted classes of action verbs; an object (or sometimes a group of objects), which is in an object dependency with the action verb and which is found in the collection of terms; optionally a modifier of the object, where found; and, in some embodiments, may include other words between the action verb and the next action verb in the sentence, although in the exemplary embodiment, only the action verb, its direct object, and any modifier of the direct object are considered as part of the actionable phrase.

For each actionable phrase 12 identified by the actionable phrase identifier 58, the search component 60 conducts a search of the knowledge base index 70 to identify relevant documents in the knowledge base 16. The search may assign a score to each of at least a sub-set of the documents, based on the occurrence of the words in the actionable phrase that are found in the document, optionally, as noted above, weighting some occurrences higher than others, such as giving higher weight when the words are found in the title, weighting words based on their tf-idf, optionally ignoring predefined stop words in the actionable phrase (like the and and), and/or using other standard techniques used in information retrieval. Other, more advanced techniques could be alternatively or additionally used (for example a binary classifier, or learning-to-rank methods).

The linking component 62 links each actionable phrase to the top ranked n document(s) for that actionable phrase, e.g., with hyperlinks (assuming that documents are found that meet a predetermined threshold score). n may be a number from 1-10, such as up to 5, e.g., 1 or 2 (assuming that there are that many documents which at least meet the threshold score on the scoring function).

The classifier component 64, if employed, may learn/use a classifier model 76. The model 76 may be learned using the retrieved documents and their corresponding scores as training data. The scores can be converted to binary values corresponding to relevant (e.g., above threshold) or nor relevant. The classifier learning component 64 then takes as input a set of relevant documents and a set of non-relevant documents and learns a binary classifier model 76 to identify relevant documents. The trained model 76 may then be used to predict new KB documents which are likely to be relevant to an actionable phrase, based on their text content.

The output component 66 generates a representation 78 of the linked document in a suitable form for presentation to a user, such as a person or a virtual agent. For example, when the user inputs a query 80, e.g., using an input device 82, such as a keypad, keyboard, or the like of the client device 44, a responsive document 14 or documents is retrieved from the knowledge base 16. When reviewing the KB document 14, if the user comes across one of the action phrases, which is indicated to have an actionable link (e.g., by highlighting, underlining, different color, different font, a bounding box, graphical representation, or the like), the user can activate the link, e.g., by clicking on or hovering over the actionable phrase, or executing software instructions, to retrieve information from the linked document 18, which may be presented in a same window, or separate window, on the screen 84 of the client device 44, or the linked document may be forwarded to a customer for review. Alternatively, a virtual agent can actuate the link to retrieve information from the linked document.

As will be appreciated, the linking system which creates the links between documents may be hosted by a separate computer than a system which subsequently retrieves documents from the KB for a user, displays the actionable links in the document to the user, and displays information from the linked document(s) when the link is activated. While the linking could be performed in real time, e.g., after the user has retrieved a document, this may be time consuming and repetitive. Accordingly, in the exemplary embodiment, the links are created in an off-line stage, before searching the KB based on the user's query.

The computer-implemented linking system 10 may include one or more computing devices 36, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 30 may represent any type of non-transitory computer readable medium such as random access memory (RAM), read only memory (ROM), magnetic disk or tape, optical disk, flash memory, or holographic memory. In one embodiment, the memory 30 comprises a combination of random access memory and read only memory. In some embodiments, the processor 34 and memory 30 may be combined in a single chip. Memory 30 stores instructions for performing the exemplary method as well as the processed data 22, 70, 72, 76, 78.

The network interface 38, 40 allows the computer 36 to communicate with other devices via a computer network, such as a local area network (LAN) or wide area network (WAN), or the Internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the computer 36.

The client device 44 may be similarly configured to the server computer 36, with memory and a processor, except as noted.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a computer-implemented method for linking actionable phrases of a first document to another document (or documents) in a knowledge base 16, which can be performed with the system 10 of FIG. 1. The method begins at S100.

At S102, documents 14, 18, etc. in a knowledge base 16 are indexed according to the words that they contain, by the indexing component 50, or a corpus index 70 is otherwise provided.

At S104, a collection of domain-relevant terms (candidate objects) 72 is generated by the term identifier 52, or otherwise provided.

At S106, each document 14, 18 in the KB 16 is structurally analyzed to identify parts which may correspond to procedures, e.g., lists, by the structure analyzer 54.

At S108, at least those part(s) of each document identified by the structure analyzer 54 as corresponding to procedures are linguistically processed, by the syntactic analyzer 56. Each sentence is tokenized. Then, parts of speech and object and modifier dependencies between words and phrases are identified.

At S110, actionable phrases 12 are identified in a review document 14. Further details on this step are described below with reference to FIGURE At S112, the rest of the documents in the KB 16 are searched, based on an identified actionable phrase 20 in the review document 14, e.g., using the keyword index 70, to identify a set of top ranked reference documents, the ranking being based on a measure of similarity (similarity score) between the actionable phrase and the reference document, generated, for example, with a scoring function. The search may be performed using standard keyword searching. In the exemplary method, the similarity computation is limited to only words (surface or root form) which are identified as being in the identified actionable phrase of the review document and does not consider other words of the review document, such as the surrounding words in the same sentence or step. Thus, for example, for a review document 14 as illustrated in FIG. 4, each actionable phrase (back-up all data and power the handset oft) is considered independently and the words of the actionable phrase are used to search the index 70 for documents matching at least one of the words.

The scoring function used to compute the similarity score may be an optionally weighted function of the occurrences of words in the action phrase that are found in the reference document (either in their root form or surface form). The words of the actionable phrase 12 may be treated as a bag-of-words, i.e., without considering their order in the review document 14. In an exemplary embodiment, words of the actionable phrase can be matched with a respective word anywhere in the reference document 18. It is not necessary to find all the words of the actionable phrase in the same sentence, step, or paragraph. However, greater weight may be placed on reference documents in which the words are found closer together, such as within one word or within five words of another word from the actionable phrase. In the exemplary embodiment, it is not necessary for every word of the actionable phrase to be found in a document for the document to be retrieved. There may be a threshold on the number of words which are found (e.g., at least one or at least two). The scoring function may be a plurality of scoring functions whose scores are aggregated.

Each occurrence of a word may be counted individually or a binary function indicating its presence or absence may be used, or a weighting function, such as the term frequency-inverse document frequency (tf-idf) can additionally or alternatively be used to place greater weight on terms which occur less frequently in a document corpus, such as the knowledge base, as a whole. As titles are more concise and informative, a higher weight can be assigned to them rather than to the standard body text (everything else but titles). For example, the weight assigned to occurrences in titles may be at least 1.5 times, or at least 2 times, or at least 3 times the weight assigned to occurrences in the text body. The exemplary index 70 may be structured to indicate whether the word is present in the title or in the body. For example, the titles in the KB documents may have already been tagged to designate them as titles (and/or subtitles). A threshold score may be used to filter out documents which do not meet (or exceed) the threshold score. In particular, a set of candidate reference documents or parts thereof may be filtered, based on an experimentally chosen threshold similarity score to identify a set of relevant documents.

At S114, assuming that the set of relevant reference documents is not empty, one or more of the top ranked reference documents 18 in the set may be linked to the actionable phrase 12 in the review document 14. As will be appreciated, the same actionable phrase may appear in multiple review documents, in which case, each review document may be linked to the same set of highly-ranked reference documents (other than themselves). Optionally, human validation of the documents (or parts thereof) to be linked may be performed before a permanent linking takes place. Linking may include generating a hyperlink between the actionable phrase and at least a part of the highly ranked reference document or otherwise associating information from the reference document with the document containing the actionable phrase. If there is no document in the identified set which meets the threshold score (i.e., the set of relevant documents is an empty set), then no linking is performed.

Optionally, at S116, a classifier model 64 may be learned by the learning component 64, and used at S118 to create more links 22 in the KB. This ends the offline stage. An online stage may subsequently proceed as follows:

At S120, a query 80 may be received from a user, e.g., from the client device 44 or from a virtual agent.

At S122, one or more responsive documents 14 is/are retrieved from the knowledge base, by the output component 66, e.g., using a search engine (similar to search component 60) to find documents which include words of the query 80. A most highly ranked of these documents is presented to the user, e.g., on a display screen 84 of the client device 44 or in computer readable format for the virtual agent.

At S124, provision is made for actuation of one or more of the links 22 in the retrieved document(s). The user may choose one of the actionable phrases causing the system to retrieve information from the linked document 18, such as a part or summary thereof, and present the information to the user. Alternatively, the system 10 may automatically present information on the actionable phrases in the document.

The method ends at S126.

FIG. 3 illustrates the exemplary method of identifying actionable phrases (S110). This may include identifying action verbs (S200), based on the POS tags applied by the parser at S108, identifying candidate objects which each include an object which is in a syntactic dependency with an identified action verb (S202), and comparing the candidate object with the collection of terms 72 (S204). The entire candidate action object need not be found in the collection of terms, rather at least the direct object part should be present. The longest matching term (in number of words) in the collection can be selected as an entity for linking. If at S206, the candidate action object includes or otherwise references a term in the collection 72, the candidate object is maintained as the object for the action verb (S208) and the method proceeds to S210, otherwise the candidate object is removed (S212) and no actionable phrase is generated from it. At S210, any modifiers for the object are identified and incorporated into the action object with the object, and the actionable phrase is tagged (S214).

An advantage of focusing on actionable phrases rather than focusing on a larger span, such as an entire step, makes the search space much smaller (the search space grows exponentially as the number of words increases, in $\Theta(n^2)$). Further, most spans are uncorrelated with any entry. Actionable phrases are more likely to be those phrases that include information that would be useful to further detail for a user, concentrating on the highest potential for linking.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 36, (for example, an internal hard drive of RAM), or may be separate (for example, an external hard drive operatively connected with the computer 36), or may be separate and accessed via a digital data network such as a local area network (LAN) or the Internet (for example, as a redundant array of inexpensive of independent disks (RAID) or other network server storage that is indirectly accessed by the computer 36, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the linking method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Enriching how-to guides is expected to be particularly advantageous in making successful automated agents (virtual agents), whose purpose is to troubleshoot customers' problems relying on existing knowledge. In addition the system and method is useful in existing customer care centers by human agents, especially via chat tools.

As an example, the system may find application in a customer care setting as described, for example, in U.S. application Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al., the disclosure of which is incorporated herein by reference in its entirety.

Without intending to limit the scope of the exemplary embodiment, the following examples illustrate the application of the method in the context of a knowledge base for computer technology.

EXAMPLES

Data

The data for forming a prototype knowledge base 16 was derived by crawling WikiHow to retrieve 1758 articles, in the category Computers and Electronics, as marked on WikiHow articles, and its subcategories: Basic Computer Skills, Install-Uninstall Software, Maintenance and Repair, Phones and gadgets, Tablet Computers.

Extraction of Actionable Phrases

Most of the articles retrieved are very well structured. Each title corresponds to a specific problem/topic while if a problem has more than one solution, the article is divided into sections with informative subtitles. Instructions are in the form of a sequence of steps represented as items of numbered or bullet lists. The WikiHow specific markup (Wiki-markup) was used to identify titles, subtitles, and steps.

Each step was further segmented into sentences (using the Natural Language Toolkit (NLTK), available at http://www.nitk.org).

For each sentence POS tagging was performed using the Xerox Incremental Parser (XIP), described above.

To generate a domain-specific terminology 72, XIP's standard list of named entities was enriched using Wikipedia. The list 72 was built using the titles of Wikipedia articles from the (i) Mobile Technology and (ii) Software categories. Initially, 33,954 titles were retrieved. Entities that were unlikely to be nouns, as well as the titles containing file names, were filtered out. Using the POS-tagging information, non-noun entities were also excluded. After a manual post-processing the following words were also removed: Open, INSERT, Make, Format, Start, Replace, A, Plug-in, SET, RUN, preview, switch, clean, clear, backup, type, visit, and shutdown. If a title contained some information in brackets (e.g. Resident Evil (2002 video game), Raiden (series), Samsung Galaxy (original)), the part in brackets was removed for generating a term in the list 72. In the final list 72, 33,708 entities were kept and were encoded as a Finite State Machine (the FST was integrated using XIP).

The rules described above were then used to identify the actions and action objects forming actionable phrases.

Linking

An article index 70 was built using the Whoosh library. (see, https://pypi.python.org/pypi/Whoosh/). The index included the article and section titles, as well as the body text of each article. As titles are more concise and informative a higher weight was assigned to them rather than to the standard body text (weights of 3.0 and 1.0 respectively).

All documents containing at least one of the terms of the queries (actionable phrases) was given a score (this was achieved in Whoosh using the "OR" operator). Only the top five candidate reference documents were kept and further filtered out if they had a score equal to or lower to 15 (the threshold was decided empirically). The scoring of candidate results was performed with the BM25F ranking function with Whoosh's default parameters. BM25F is a bag-of-words retrieval function, which includes a family of scoring functions, with slightly different components and parameters (a version of the Okapi BM25 that can take document structure and titles into account). It takes into account the tf-idf of each of the keywords. See, e.g., Robertson, et al., "The Probabilistic Relevance Framework: BM25 and Beyond," Foundations and Trends in Information Retrieval, 3(4) pp. 333-389 (2009).

The present method was compared to a method in which whole steps rather than only actionable phrases, were linked, using an analogous procedure.

Results

To evaluate the exemplary linking method, two human annotators manually annotated twenty articles, from WikiHow, with actionable phrases, corresponding, in total, to slightly more than 700 annotations. In addition to the first two, a third annotator indicated whether the links found for the corresponding actionable phrases were correct.

Actionable Phrase Detection

The kappa score (a measure of the agreement between annotators) for the actionable phrase annotations was 0.79. In the present method, finding a part of the actionable phrase is sufficient, as it allows making a correct link in the linking step. Based on that, the average $F_1$ (a function of recall and precision) was 67.35, as shown in Table 1.

TABLE 1

Results for the detection of actionable phrases for linking purposes

| Annotator | Precision | Recall | $F_1$ |
|---|---|---|---|
| 1 | 72.2 | 63.23 | 67.72 |
| 2 | 77 | 56.93 | 66.97 |
| Average | | | 67.35 |

Taking a much stricter approach where the exact boundaries of the annotations should be found for a phrase to be considered correct (closer to traditional information extraction instead of the present looser setting) for a phrase to be considered correct, the average $F_1$ is 59 (a fixed score of 0.5 is assigned when there is an intersection of tokens between the annotations done by the human annotators and the entities detected by the method, if the boundaries are not exactly the same, instead of 1 as in the first case).

The above results indicate that the exemplary method provides useful results. As will be appreciated, human annotators also find the task of identifying action phrases difficult.

Linking

Figure 5:
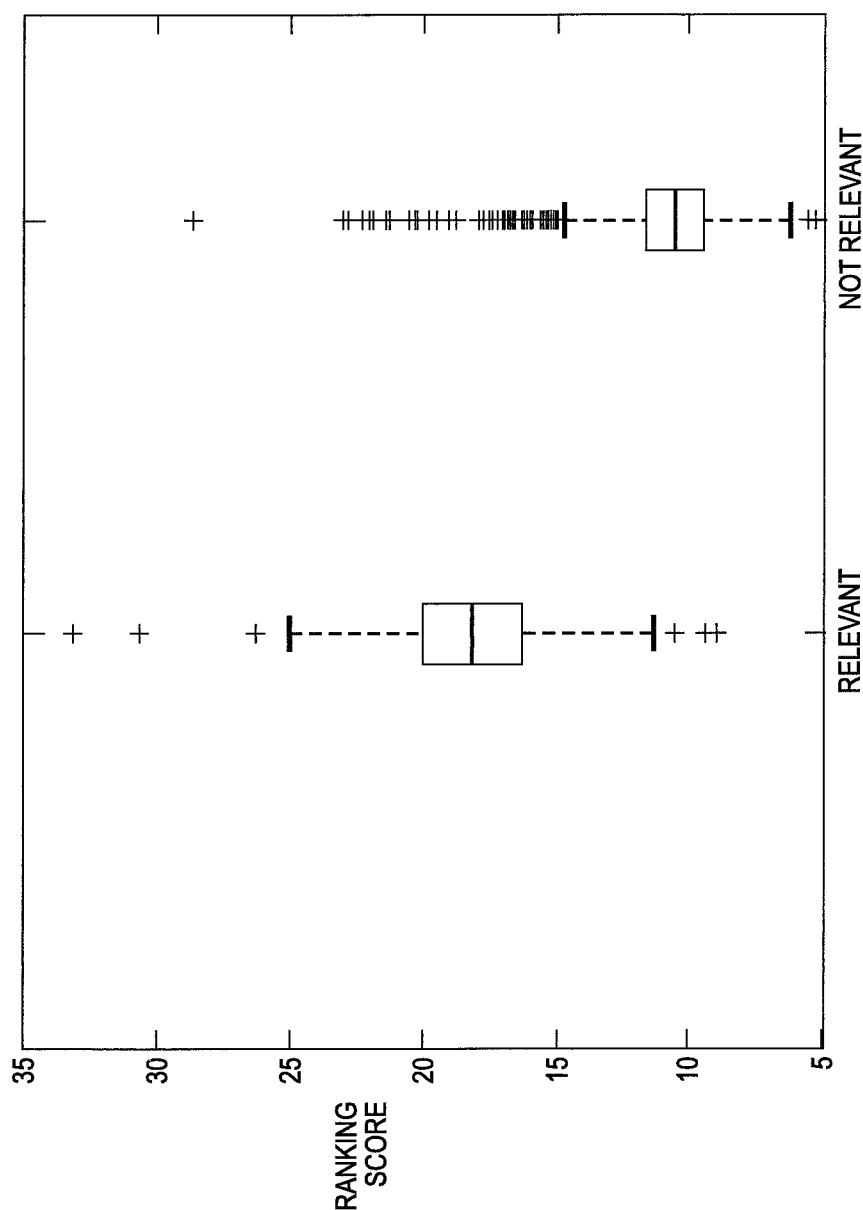
FIG. 5 is a boxplot of ranking scores using actionable phrases.
Figure 6:
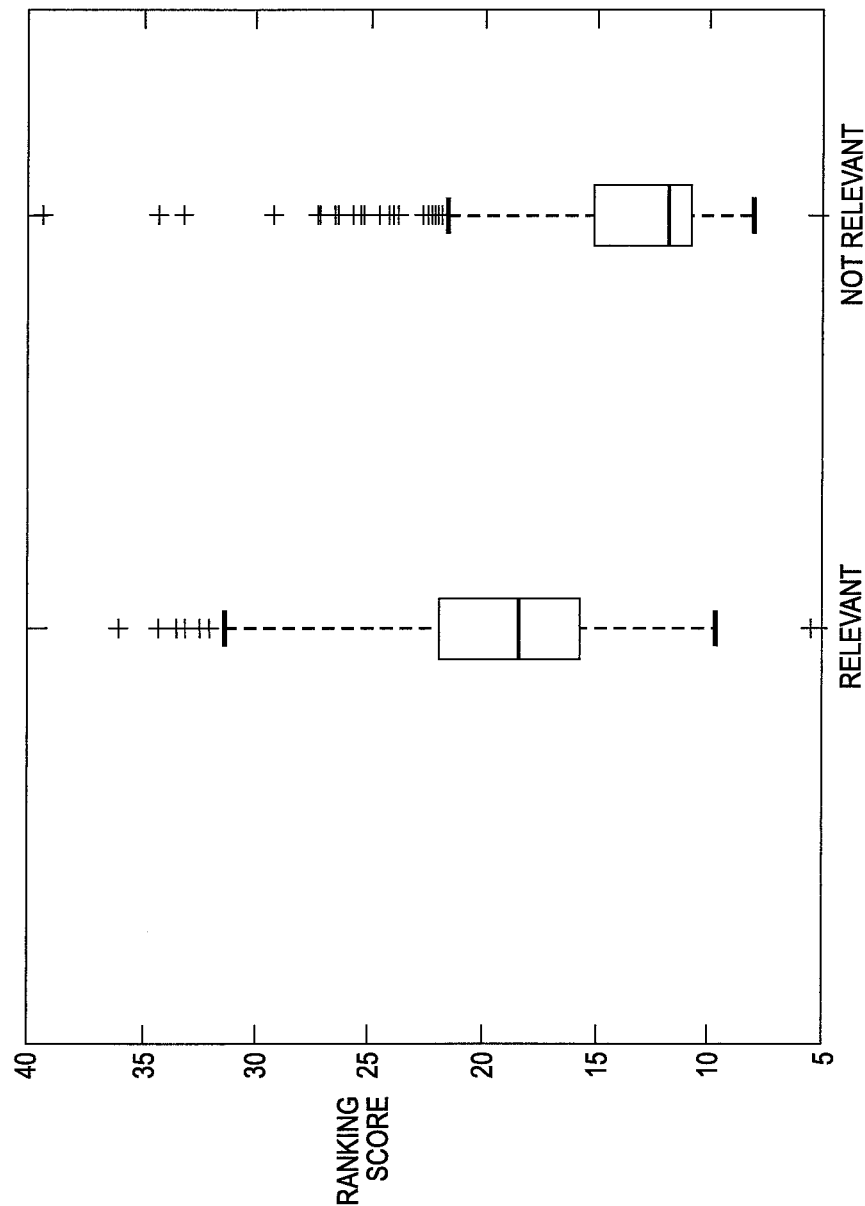
FIG. 6 is a boxplot of ranking scores using steps.

The annotations of the reference documents, which were labeled as being relevant or not to the selected span (actionable phrase or step) were analyzed. FIG. 5 shows the distribution of the ranking scores for the actionable phrases alone and FIG. 6 for steps, as returned by the ranking library used. The obtained scores when using entire steps (FIG. 6) are much more spread out (as indicated by the larger boxes) than when using only the actionable phrase (FIG. 5). This may be due in part to the text span of a step being much longer, in general. Significantly, the relevant group of the reference documents seems more separated from the irrelevant one in the actionable phrase scenario, while the two groups overlap much more when using whole steps.

TABLE 2

Kappa Scores

| Annotators | Kappa scores between annotators for linking actionable phrases | Kappa scores between annotators for linking steps |
|---|---|---|
| 1-2 | 0.71 | 0.91 |
| 1-3 | 0.69 | 0.77 |
| 2-3 | 0.71 | 0.86 |

Figure 7:
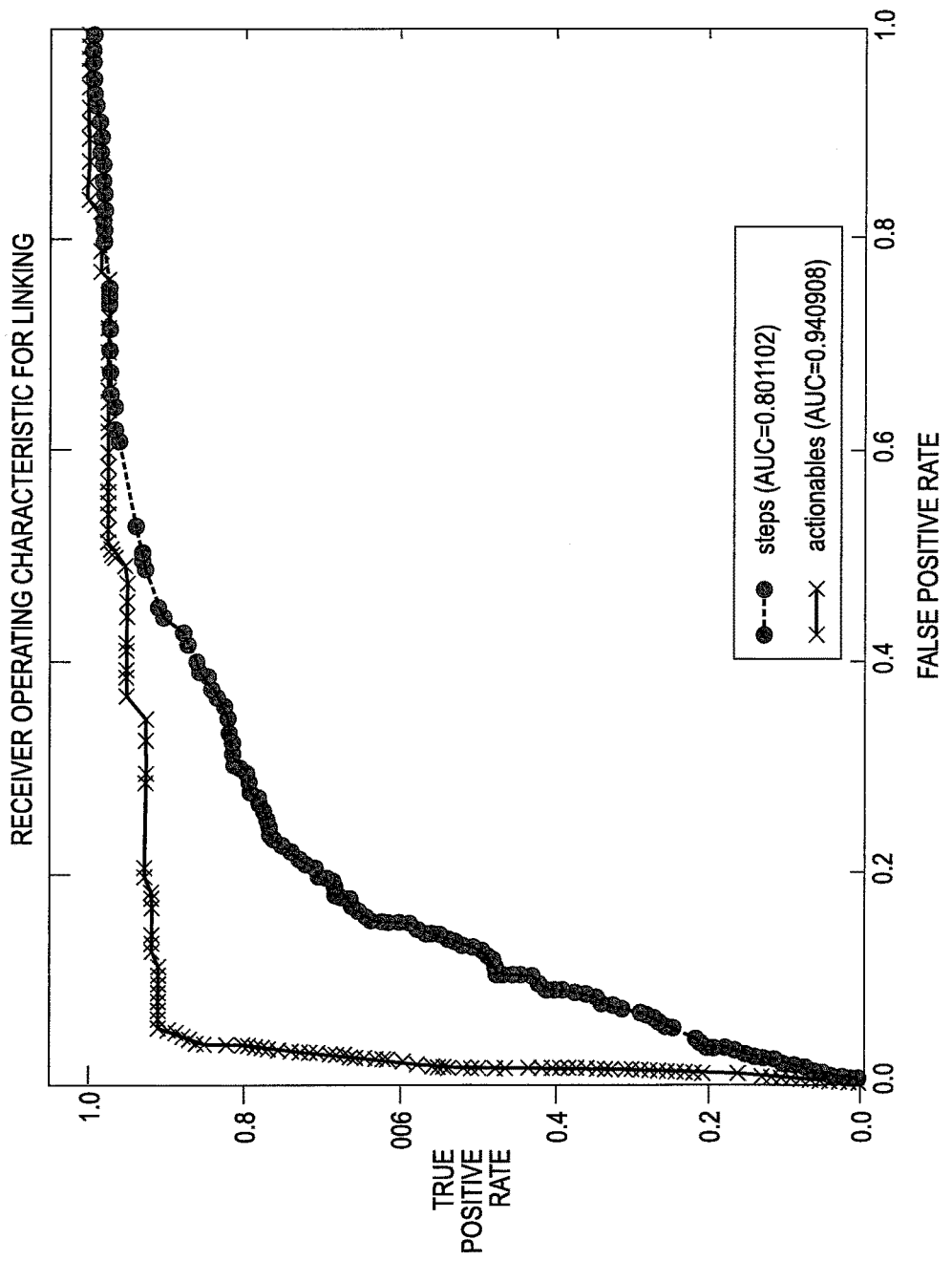
FIG. 7 shows Received Operating Characteristic (ROC) curves using the scores obtained when querying with actionable phrases and with steps.

That the results using actionable phrases as queries are easier to separate into relevant and irrelevant (compared to using whole steps) is confirmed in FIG. 7. ROC curves are plotted which illustrate the False Positives Rate (proportion of non-relevant documents that are retrieved, out of all non-relevant documents available) versus True Positive Rate (Recall). The ROC curve corresponding to actionable phrases is a clear improvement over the one using steps, as indicated in a higher area under the curve (AUC) (0.94 versus 0.82). The recall is only over the documents that passed the score threshold (fixed at 15). For actionable phrases there were 60% more such documents than were obtained when using steps.

In the study, the fact that verbs may have different modalities was ignored, i.e., only the first three rules were used for identifying action verbs. Automatic detection of modalities could be expected to improve the accuracy, since actionable phrases frequently oblige the user to do something.

Coordination and co-reference of pronouns were also not dealt with in the study. Improvements could be achieved in actionable phrase extraction performance, especially in terms of coverage. For example, in the following sentence taken from the corpus "shut down and restart a remote computer," only "restart a remote computer" was detected by the method while "Shut down . . . a remote computer" was missed. Identifying coordination would allow the method to handle such cases appropriately.

In the evaluation, a classifier was not employed. If there were more annotated data, the data could be used as seeds for training a classifier model. Although the annotation process is time-consuming and often not an easy task for human annotators, statistical machine learning could yield improvements in coverage.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A linking method comprising:
providing a knowledge base comprising a corpus of documents, each of the documents describing a respective procedure, wherein for each of a plurality of the documents, an actuable link in a first of the plurality of documents links to another document in the document corpus describing another procedure, the actuable links in the knowledge base having been generated by a method comprising:
providing a collection of at least 100 domain-specific terms;
for each of a plurality of documents in the document corpus, applying rules for identifying action verbs in at least a part of the document corresponding to a procedure and identifying at least one actionable phrase including one of the action verbs in at least a first of the plurality of documents, the identifying of the at least one actionable phrase comprising:
identifying a candidate action object, the candidate action object including a direct object of the identified action verb;
comparing the identified candidate action object to terms in the collection of terms; and
when at least the direct object of the compared candidate action object is found in the collection of terms, identifying an actionable phrase comprising the action verb and respective action object;
for each of the at least one identified action phrase:
identifying a set of documents in a document corpus using a scoring function which takes into account occurrences of words of the actionable phrase in each identified document; and linking the actionable phrase in the document to at least a part of another one of the documents in the set of documents or to information extracted therefrom;

after providing the knowledge base with the actuable links, receiving a query from a user;

retrieving one of the corpus of documents from the knowledge base which is responsive to the query;

providing for the user to actuate one of the links in the retrieved document; and when the user actuates the link, retrieving information from the respective linked other document relating to the actionable phrase and presenting the retrieved information to the user to allow the user to find out more detail related to the actionable phrase of the retrieved document procedure on how to perform a specific instruction, wherein the providing of the knowledge base, receiving the query, retrieving information, and presenting the retrieved information is performed with a processor.

2. The method of claim 1, wherein the identifying of the candidate action object comprises providing for identifying modifiers of the direct object and, where a modifier of the direct object is found, including the identified modifier in the candidate action object.

3. The method of claim 1, wherein the identifying the action verb includes applying a plurality of rules to determine if an identified verb meets at least one of the rules.

4. The method of claim 3, wherein the plurality of rules comprises at least one rule requiring that:
the verb starts a sentence;
the verb follows a modal verb;
the verb has the same form as the infinitive;
the verb has a modality of obligation; or
a combination thereof.

5. The method of claim 1, wherein the method further comprises generating the collection of terms.

6. The method of claim 1, wherein the method further comprises syntactically processing at least a part of the first document to identify parts of speech for tokens in the at least a part of the first document and dependencies between verbs and their direct objects.

7. The method of claim 6, further comprising analyzing a structure of the first document to identify a part of the document corresponding to a procedure, the syntactic processing being performed on the identified part.

8. The method of claim 1, when the method comprises analyzing a structure of the first document to identify a part of the first document corresponding to a procedure, and wherein the identifying at least one actionable phrase comprises identifying the at least one actionable phrase in the procedure part.

9. The method of claim 1, wherein the method is repeated for a plurality of other documents in the document corpus, using a respective other document as the first document.

10. The method of claim 9, further comprising receiving a query, retrieving at least one document from the document corpus and providing for a user to actuate links associated with the actionable phrases in the at least one retrieved document.

11. The method of claim 1, further comprising retrieving information from the linked document when the link is actuated in the first document.

12. The method of claim 1, wherein the identifying of the set of documents in the document corpus includes scoring the documents in the corpus with a scoring function and filtering out documents which do not at least meet a threshold score.

13. The method of claim 1, further comprising providing for human validation of the linked document.

14. The method of claim 1, further comprising learning a classifier model with the actionable phrases identified in a plurality of documents in the document corpus.

15. A computer program product comprising a non-transitory recording medium storing instructions, which when executed on a computer, causes the computer to perform the method of claim 1.

16. A system comprising memory storing instructions for performing the method of claim 1 and a processor in communication with the memory for executing the instructions.

17. The method of claim 1, wherein in the identifying a set of documents in a document corpus, the similarity computation is limited to only words which are identified as being in the identified actionable phrase.

18. The method of claim 1, wherein each actionable phrase is a text fragment that describes how to perform a certain action.

19. A linking system comprising:
memory which stores a collection of domain-specific terms and an index for a document corpus, the domain-specific terms in the collection being relevant to the domain of the document corpus and being terms on which an action verb could perform an act, the index for the document corpus indexing words according to the document in which they appear;

a syntactic analyzer which processes documents in the document corpus to identify parts of speech of words in the document and dependencies between verbs and their direct objects, the documents in the corpus describing respective procedures using actionable phrases, each action phrase being a text fragment that describes how to perform a certain action, some of the action phrases each being further explained in another document in the corpus;

an actionable phrase identifier which identifies actionable phrases in the documents, each actionable phrase comprising an action verb and an action object, the action object including a direct object of the action verb, which is found in the stored collection of domain-specific terms and, where identified, a modifier of the direct object;

a search component which queries the index with words of an identified actionable phrase of a first of the documents and uses a scoring function to identify at least one other document in the document corpus that at least meets a threshold score;

a linking component which links the identified actionable phrase to at least a part of the at least one other document to information extracted therefrom, whereby when a document in the corpus is retrieved in response to a subsequently-submitted query, activation of actuable links in the retrieved documents causes a short summary or relevant portion of the linked other document to be displayed to allow a reader to find out more detail related to the actionable phrase on how to perform a specific instruction in the procedure of one of the retrieved documents; and a processor in communication with the memory which implements the syntactic analyzer, actionable phrase identifier, search component, and linking component.

20. The system of claim 19, further comprising at least one of:
- a document corpus indexing component which generates the index;
- a term identifier which generates the collection of domain-specific terms;
- a structure analyzer which analyzes a structure of the documents to identify a part of a respective document corresponding to a procedure, the actionable phrase identifier identifying actionable phrases in the parts of the documents that are identified as corresponding to a procedure; and
- an output component which outputs the links.

21. A linking method comprising:
- generating a collection of domain-specific terms which are relevant to a domain of a document corpus;
- after generating the collection of domain-specific terms, with a processor, for each of a plurality of documents in the document corpus:
  - applying rules for identifying action verbs in at least a part of the document corresponding to a procedure, the rules including at least one rule requiring that:
    - the verb starts a sentence;
    - the verb follows a modal verb;
    - the verb has the same form as the infinitive;
    - the verb has a modality of obligation; or
    - a combination thereof;
  - for each of the identified action verbs, identifying a respective direct object of the action verb;
  - determining whether the direct object is found in the collection of domain-specific terms;
  - for a direct object which is found in the collection of domain-specific terms, generating an actionable phrase comprising the action verb, its direct object, and any identified modifiers of the direct object;
- searching an index of the document corpus with words of the actionable phrase to identify other documents in the document corpus which meet at least a threshold score on a scoring function which is based on the occurrences of the words in the actionable phrase that are found in the other document;
- providing for generating a link to information from at least a part of one of the other documents that at least meets the threshold score from the actionable phrase; and
- providing for actuation of one or more of the links in a retrieved document from the corpus, causing information to be retrieved from a linked document and presented to a user to allow the user to find out more detail on how to perform a specific instruction in a procedure.

* * * * *